(No Model.)

J. H. COOK.
ANCHOR BOLT BUSHING.

No. 575,282. Patented Jan. 12, 1897.

Witnesses:
Raphaël Netter
James N. Catlow

Inventor
John H. Cook,
by Duncan & Page,
Attorneys.

UNITED STATES PATENT OFFICE.

JOHN H. COOK, OF WEST SPRINGFIELD, MASSACHUSETTS, ASSIGNOR TO HENRY B. NEWHALL, OF PLAINFIELD, NEW JERSEY.

ANCHOR-BOLT BUSHING.

SPECIFICATION forming part of Letters Patent No. 575,282, dated January 12, 1897.

Application filed September 12, 1894. Serial No. 522,795. (No model.)

*To all whom it may concern:*

Be it known that I, JOHN H. COOK, a citizen of the United States, formerly residing in West Springfield, county of Hampden, and State of Massachusetts, now residing in Brooklyn, county of Kings, and State of New York, have invented certain new and useful Improvements in Anchor-Bolt Bushings, of which the following is a specification, reference being had to the drawings accompanying and forming a part of the same.

The present invention relates to an improved metal bushing for screw-bolts, which bushing is used to anchor or fix a screw or screw-bolt in stonework, brickwork, masonry, or other like material in which a thread for the bolt cannot readily be cut.

Figure 1:
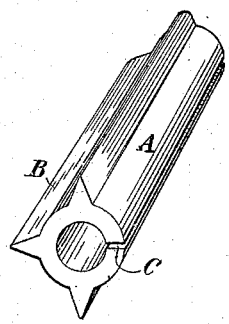
Figure 2:
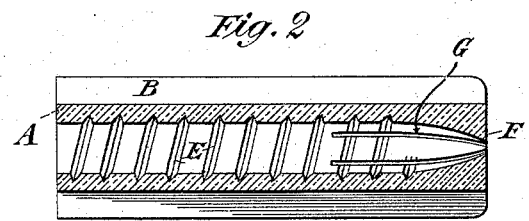
Figure 3:
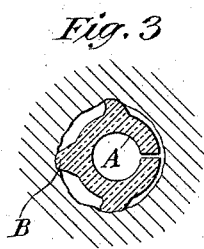
Figure 4:
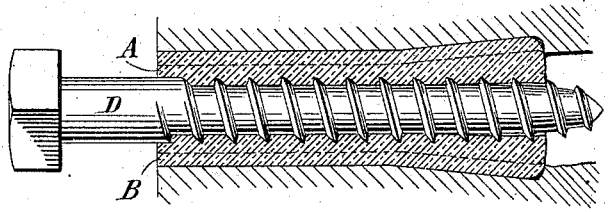

Referring to the drawings, Figure 1 is a perspective view of my improved bushing. Fig. 2 is a longitudinal section of the same. Fig. 3 is a cross-section of the same shown as forced in a hole in a wall, as of stone or brick work, and before receiving the anchor-bolt. Fig. 4 is a longitudinal section of the same, also showing a lag screw or bolt inserted therein.

A represents the main body of the bushing, which is tubular, preferably nearly cylindrical in form, and is provided with one or more V-shaped ribs B, extending radially from and longitudinally of the same. This tubular bushing is slotted along its length, as shown at C. The bushing is made of any suitable metal, a soft metal being usually employed, such as lead, though soft iron and the like may be employed.

In fixing a bolt or screw in a brick wall, stonework, or masonry, a hole is first drilled of a size somewhat larger than the body part of the bushing. The bushing is then driven into this hole, the exterior V-shaped ribs thereof cutting grooves in and being more or less embedded into the material of the wall, somewhat as illustrated in Fig. 3, which shows a soft-metal bushing. A threaded bolt D, of a diameter slightly greater than the bore of the bushing, is then screwed into the bushing to the required depth, for example, as seen in Fig. 4. The thread of the bolt will cut its way readily in the body of the bushing if the bushing be of soft metal, such as lead, and the displaced portions of the bushing will be forced into the spaces between the bushing and the wall and into the interstices of the wall, so that the hole in the wall will be practically filled, and a strong anchorage will thus be afforded for the bolt. This action of the bolt on the bushing is to an important extent dependent upon the presence of the longitudinal slot in the bushing, which slot permits the body of the bushing to open and expand along its length to engagement with the wall, at the same time forcing the ribs of the bushing to firmer engagement with the walls, and also permits the easy advancement of the screw and the formation in the bushing of a suitable thread to engage the bolt or screw. If the bushing be of iron or metal of similar hardness, a thread E may be cut in the bore of the bushing, as seen in Fig. 2.

In some cases it may be desirable, where a particularly strong anchorage is desired and where it is desired that the hold or grasp of the bolt shall be mainly at the inner end of the same, to thicken the walls of the bushing at its inner end, as shown at F in Fig. 2. The threaded bolt in passing through this inner end will more powerfully force the metal of the bushing into the surrounding wall, and thereby afford a stronger grip upon the wall than at any other point throughout the length of the bushing, Fig. 4. Thus in case, for illustration, of soft wall material or material likely to be cracked at the surface by the expansion of the bushing, the main anchorage grasp or hold of the bushing will be at its inner end. To further facilitate the expansion of the inner end of the bushing than is permitted by the slot C, other shorter slots G may be cut in this end of the bushing; also, in the case of the bushing being of relatively hard metal it would be well to have the contracted inner end of the bore unthreaded, as seen in Fig. 2.

The longitudinal ribs on the bushing are an important feature, in that when the bushing is driven into the masonry these ribs will cut grooves in the same, in which grooves they become seated. By these means it is insured that the bushing will not turn in the hole in which it is seated when the bolt or screw is forced through the same. If such engagement of the bushing-ribs with the wall were not insured, there would be danger, by reason of the friction between the screw and the bushing, that the bushing would turn with the screw and thereby lose its hold upon the wall.

What is claimed as new is—

1. A tubular bushing for anchoring a screw or screw-bolt in stone, brickwork or like material, consisting of a metallic tube having one or more longitudinal ribs B, and being slotted by a single slot along its length, as and for the purposes set forth.

2. A longitudinally-slotted tubular bushing A for anchoring a screw or screw-bolt in masonry or like material, which bushing is provided with walls of varying thickness and with one or more ribs B, substantially as and for the purpose set forth.

3. A longitudinally-slotted and interiorly-threaded tubular bushing A for anchoring a screw or screw-bolt in masonry or like material, which bushing is provided with one or more longitudinal ribs B, substantially as and for the purpose set forth.

JOHN H. COOK.

Witnesses:
ROBT. F. GAYLORD,
JAMES N. CATLOW.